Sept. 21, 1965    J. J. LINES ETAL    3,206,991
VARIABLE SPEED POWER TRANSMISSION
Filed March 18, 1963    4 Sheets-Sheet 1

INVENTORS:
DALE D. KLOSS
JERRY J. LINES
BY
Schroeder & Siegfried
ATTORNEYS

INVENTORS:
DALE D. KLOSS
JERRY J. LINES
BY
Schroeder & Siegfried
ATTORNEYS

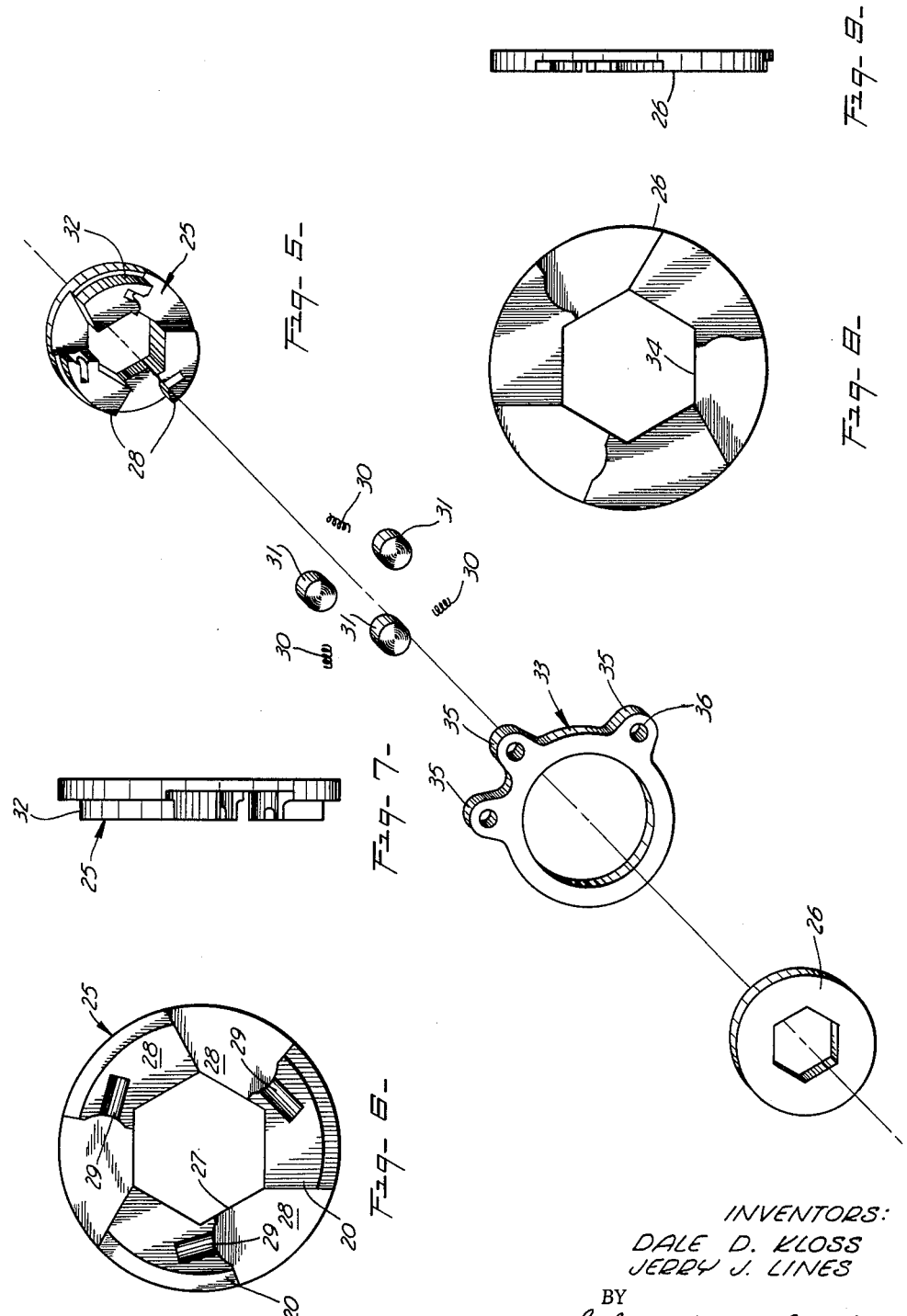

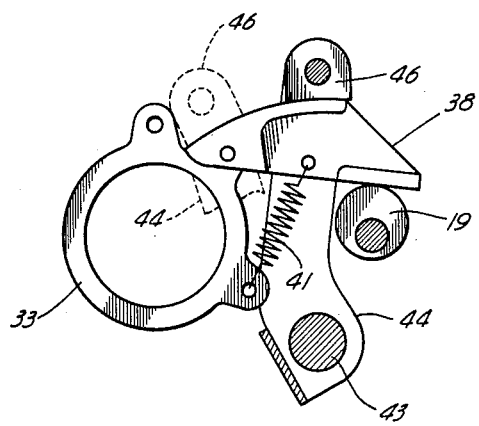
Fig-10-
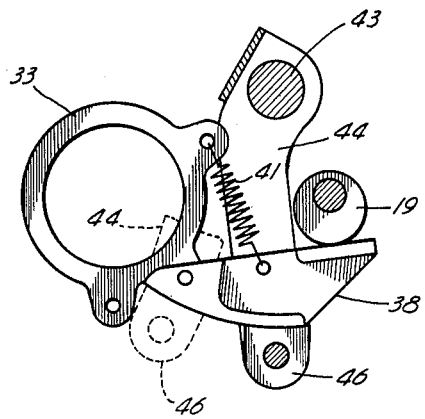
Fig-11-

United States Patent Office 3,206,991
Patented Sept. 21, 1965

3,206,991
VARIABLE SPEED POWER TRANSMISSION
Jerry J. Lines, Minneapolis, and Dale D. Kloss, Excelsior, Minn., assignors to The Zero-Max Company, Minneapolis, Minn., a corporation of Minnesota
Filed Mar. 18, 1963, Ser. No. 265,894
6 Claims. (Cl. 74—124)

This invention relates to power transmissions. More particularly, it relates to variable speed power transmissions designed particularly to transmit rotary power over a wide range at an infinite number of variations of speed.

It is a general object of our invention to provide a novel and improved variable speed power transmission of simple and inexpensive construction and operation.

A more specific object is to provide a novel and improved variable speed power transmission which can be manufactured for approximately half of the cost of variable speed power transmissions heretofore known and which can be operated with a greater range of control.

Another object is to provide a novel and improved variable power transmission of simple and inexpensive construction and operation which can be constructed more compactly than variable speed power transmissions heretofore known for a given work load.

Another object is to provide a novel and improved variable speed power transmission which is designed and constructed to provide a longer useful life of the machine than comparable variable speed power transmissions heretofore known.

Another object is to provide a novel and improved variable speed power transmission having a range of control from zero to the maximum speed.

Another object is to provide a novel and improved variable speed transmission capable of having its speed changed whether running or stationary, capable of having its speed changed frequently, capable of being used as a clutch with instant and positive engagement away from zero, and capable of running indefinitely at zero position without any build-up of heat.

Another object is to provide a novel and improved variable speed power transmission having an improved performance of the control mechanism for varying the speed of the device.

Another object is to provide a novel and improved variable speed power transmission with an overriding clutch construction uniquely designed to give substantially longer life than such clutch constructions heretofore known.

Variable speed power transmissions as heretofore known have some serious disadvantages. One of these disadvantages is that the range of control of the speeds normally excludes the zero range so that the variation in speed is only from a slow speed to a greater speed rather than from zero to maximum speed. Another disadvantage and a primary one is the fact that most if not all variable speed power transmissions heretofore known are relatively expensive to manufacture and consequently involve very substantial cost because of the time and care required in the manufacture of the device and its assembly. Another problem involved in variable speed power transmissions has been the difficulty in maintaining the device in small compass, particularly in the transmission of low speeds. Still another problem has been the difficulty in constructing such a variable speed transmission which will have a satisfactory useful life span and which will have a control mechanism for varying the speed which will function in the desired manner. Our invention is directed toward the solution of these problems.

These and other objects and advantages of this invention will more fully appear from the following description, made in connection with the accompanying drawings wherein like reference characters refer to the same or similar parts throughout the several views, and in which:

FIG. 5 is an exploded view of one of the over-running clutches utilized to transmit the power to the driven shaft.

FIG. 6 is an inner side elevational view of one of the clutch discs constituting an element of one of the over-running clutches.

FIG. 7 is an edge elevational view of the clutch disc shown in FIG. 6.

FIG. 8 is an inner side elevational view of the end plate of one of the individual over-running clutches shown at the lower left of FIG. 5; and FIG. 9 is an edge elevational view of the end plate shown in FIG. 8.

FIG. 10 is a gearing schematic of our transmission arranged as shown in FIGS. 1–4, inclusive, for rotating the driven shaft in a clockwise direction as viewed in FIG. 1, with non-driving position shown in broken lines, and FIG. 11 is a gearing schematic of our transmission arranged for rotating the driven shaft in a counter-clockwise direction, with non-driving position shown in broken lines.

Figure 1:
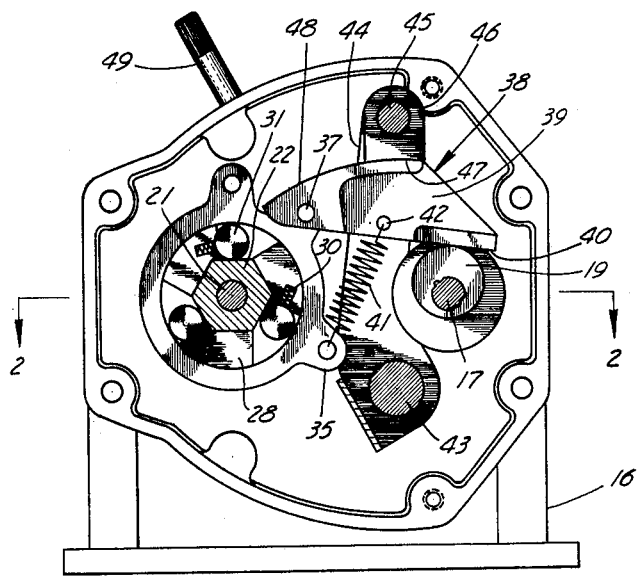
FIG. 1 is a vertical sectional view taken along line 1—1 of FIG. 2.
Figure 2:
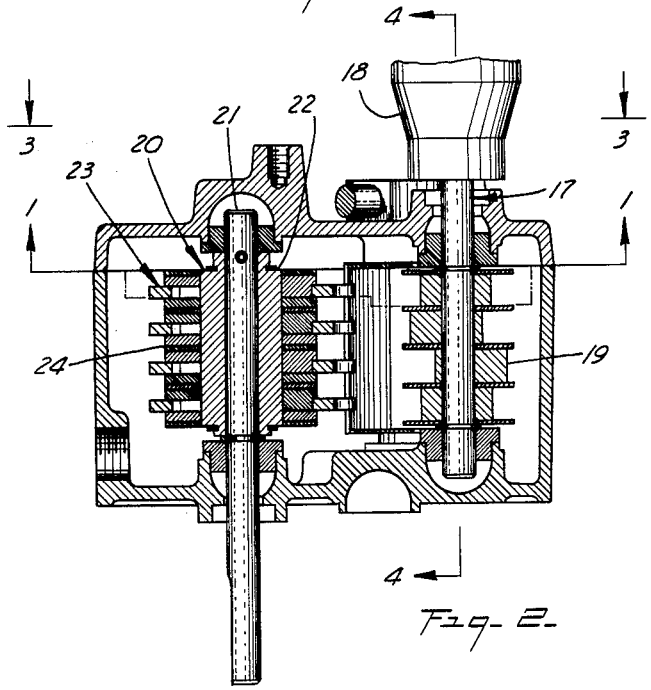
FIG. 2 is a horizontal sectional view taken along approximately line 2—2 of FIG. 1.

One embodiment of our invention, as shown in FIGS. 1–10, inclusive, is comprised of a housing indicated generally as 12 which includes a cup-shaped element 13 having an end wall 14 and an end plate 15. The housing 12 is adapted to be connected, as best shown in FIG. 1, to a base member 16.

Rotatably mounted within the housing 12 between the side wall 14 and the end plate 15 is a driving means in the form of a crankshaft 17. This crankshaft 17 is provided with a flexible coupling 18 adapted to be connected to a driving member such as an electric motor or other source of rotary power (not shown). The crankshaft 17 carries a plurality of cams 19 (four in number) which are carried in positions ninety (90) degrees out of phase.

A driven member in the form of an over-riding one way clutch indicated generally by the numeral 20 is also rotatably mounted in the housing between the side wall 14 and the end plate 15. As shown, the over-riding clutch includes a driven shaft 21 which carries a sleeve 22 which has a peripheral surface hexagonal in shape. This sleeve 22 carries a plurality of individual clutches indicated generally by the numeral 23, the latter of which are separated by individual spacer discs 24.

FIGS. 6–9, inclusive, best illustrate the construction of the individual clutches 23. As shown, each clutch includes a clutch disc 25 and an end plate 26. Each disc 25 has a hexagonal bore 27 adapted to receive the hexagonal sleeve 22 therein in snug fitting driving relation. Carried on one surface of the clutch disc 25 is a plurality of blocks 28 (three in number) and, as best shown in FIG. 6 these blocks are spaced circumferentially around the bore 27. Each of the blocks 28 is constructed as shown best in FIGS. 1 and 6 to extend around one of the corners of the hexagonal sleeve 22. Each of the blocks 28 is provided with a bore 29 which extends somewhat circumferentially and is adapted to receive a spring 30 therewithin, the latter being of sufficient size to extend outwardly beyond the bore and bear against its associated roller 31. As best shown in FIG. 1, these rollers bear upon one of the hexagonal surfaces of the sleeve 22 and are constantly urged by its associated spring 30 in the direction of intended rotation of the driven shaft 21. It will be understood, of course, that the sleeve 22 is fixedly secured to the shaft 21 so as to drive the same when the sleeve is driven.

Each of the blocks 28 is spaced slightly inwardly of the circumference of the disc 25 as best shown in FIG. 5 and 7 to provide an arcuate shoulder 32. The end plate 26 is formed, as best shown in FIGS. 8 and 9 to cooperatively engage associated clutch disc 25 to define a channel within which a drive ring 33 is rotatably mounted. The end plate 26 has a hexagonal bore also adapted to receive the sleeve 22 in snug fitting relation. The bottom of the channel within which the drive ring 33 rides is the circumferential surface of the associated shoulder 32 of its clutch disc and is slightly spaced radially inwardly from the inner circumference of the drive ring 33. The drive ring 33 has a plurality of ears 35 extending radially outwardly at various circumferentially spaced points as best shown in FIGS. 5 and 1. A transverse bore 36 is provided in two of the ears to accommodate a wrist pin 37 or spring 41 as best shown in FIG. 1.

Pivotally connected to one of the ears 35 by the wrist pin 37 above the axis of the shaft 21 is an elongated rocker arm 38. Each of the four drive rings 33 is similarly connected to one of four such rocker armswitch, as best shown in FIG. 1, is actually a form of lever. Each of the rocker arms 38 extends away from the associated driver ring 33 toward and above the cam of the crankshaft 17 with which it is associated. As best shown in FIG. 1, each of the rocker arms 38 is somewhat reduced at its side as at 39 and has a cam follower 140 formed with an engaging surface 40 which bears upon its associated cam 19 in driven relation. Each of the rocker arms 38 is constantly urged downwardly, as viewed in FIG. 1, by a spring member 41 which is connected to its associated rocker arm 38 through an opening 42 provided for that purpose. The other end of the spring 41 engages one of the ears 35 which, as shown, is disposed below the axis of the driven shaft 21. The springs 41 maintain each of the rocker arms 38 in constant engagement with its associated cam 19 and cause its associated drive ring 33 to commence to be returned toward its starting position as soon as its associated cam has reached its point of maximum eccentricity and to remain in engagement throughout its movement to minimum eccentricity whereat it is at its starting point.

Pivotally mounted between the end wall 14 and the end plate 15 below the camshaft 17 and the driven shaft 21 is a pivot rod 43. This pivot rod is fixedly connected to an inverted U-shaped fulcrum carrier 44 made of strap metal and swinging with the pivot rod 43 as it is rotated. The base of the fulcrum carrier 44 is comprised of a pin 45 which carries a plurality of fulcrum blocks 46. Each of the fulcrum blocks 46 has an arcuate surface 47 which engages and rides along the arcuate upper surface 48 of its associated rocker arm 38. The four fulcrum blocks 46 can be shifted longitudinally of the four rocker arms 38 to control the extent of drive transmitted to their associated drive rings 43, by moving the control arm 49. Thus the four fulcrum blocks 45 move as a unit and can be moved from the position shown in FIG. 1 to the left to a position over or ahead of the wrist pins 37 which is zero drive position, whereat they abut against the ear 35 (farthest to the left as viewed in FIG. 1) and lock the clutch at zero in that position (see dotted positions, FIGS. 10 and 11).

Figure 3:
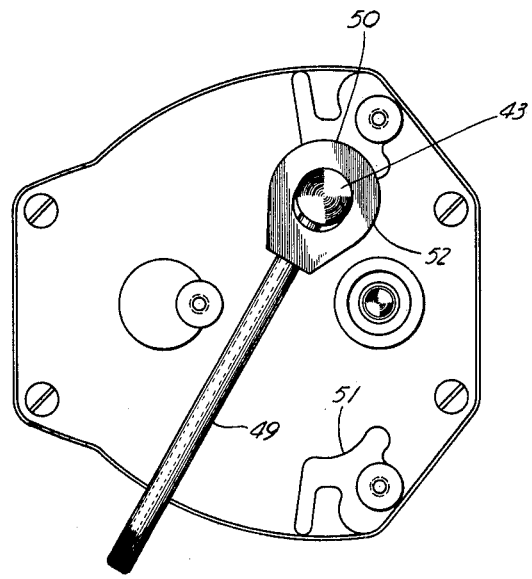
FIG. 3 is an inverted side elevational view of the assembled variable speed power transmission showing the control means in detail and taken along approximately line 3—3 of FIG. 2.
Figure 4:
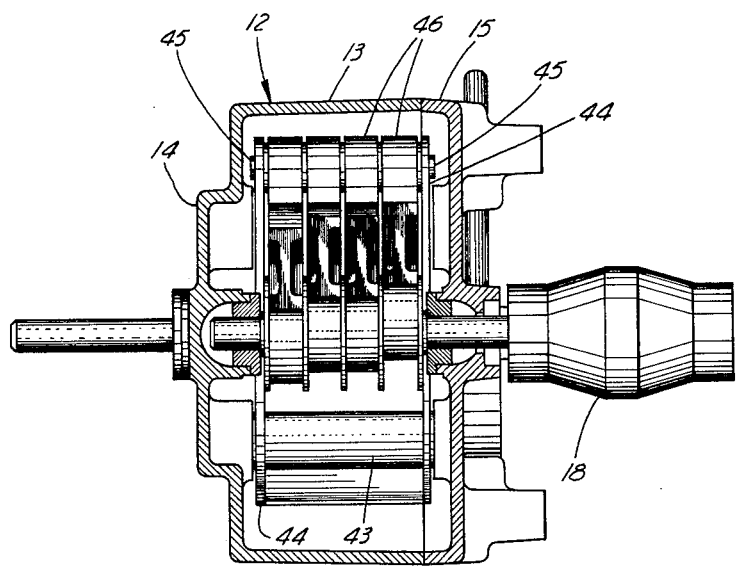
FIG. 4 is a vertical sectional view taken along line 4—4 of FIG. 2.

The control arm 49 has associated therewith a novel control element which is best illustrated in FIG. 3. As shown, this control includes an arcuate boss 50 which is formed on the outer surface of the end plate 15. A similarly shaped arcuate boss 51 is carried at the opposite side of the end plate for a purpose to be hereinafter described. It will be noted that the arcuately shaped boss 50 is spaced from the pivot rod 43 and that a metal ring 52 encircles the rod 43 in a loose fit with its exterior surface bearing against the arcuate surface 50. A slot (not shown) formed in the ring 52 accommodates the control arm 49 which is threaded through the rod 43 and has its inner end bearing against the inner surface of the ring 52, thereby causing the ring 52 to bear against the arcuate surface 50 and hold the fulcrum carrier 44 in any desired position.

In operation the cam 19 of the camshaft 17 drive the rocker arms by alternately raising and lowering them as the camshaft rotates. As the rocker arms are elevated and lowered the fulcrum blocks 46 turn relative to the pin 45 in unison with the rocking motion of the rocker arm. When the cam is moving toward its position of maximum eccentricity, it presses the rocker arm upwardly against the fulcrum block 46 which functions as a fulcrum and causes the end portion of the rocker arm connected to the drive ring 33 to be moved to drive the ring 33 in a clockwise direction as viewed in FIG. 1. As the ring 33 is driven in a clockwise direction the associated roller 31 is cammed between the inner surface of the drive ring 33 and the exterior surface of the hexagonal sleeve 22 to drive the shaft clockwise, the associated spring 30 maintaining the roller 31 constantly in position to cause this camming action to take place whenever the drive ring 33 is rotated in a clockwise direction. As soon as the point of maximum eccentricity has been reached by the cam 19, the spring 41 commences to draw the associated drive ring 33 in a counter-clockwise direction as the end portion of the rocker arm 38 which is connected to the drive ring is released to move in a counter-clockwise direction through the lowering of the eccentricity of the cam. Thus the drive ring 33 will have moved to its initial starting position by the time the cam has reached its point of minimum eccentricity so that upon further rotation of the camshaft and consequent causing of the cam to move toward its point of maximum eccentricity, the rocker arm will again commence to drive the sleeve 22 and driven shaft 21. It will be readily appreciated that with the ninety degree out of phase arrangement of the cam 19, for all proctical purposes a continuous driving motion is imparted to the driven shaft 21.

The extent to which the shaft 21 is driven depends upon the extent of movement or arc of movement of the drive rings 33 and this in turn is determined by the position of the fulcrum blocks 46 along the arcuate surface 48 of the rocker arms 38. When in the position shown in FIG. 1 the drive rings will be driven to a maximum and consequently the driven shaft 21 will be driven most rapidly. When the carrier 44 and the fulcrum blocks 46 are moved as far as possible to the left as viewed in FIG. 1, to abut against the ear 35 which is directly above the shaft 21, then rotation of the crankshaft 17 will not cause any driving action to take place upon the drive rings 33 and consequently the driven shaft 21 will not be driven and the transmission will be locked at zero position.

If it is desired to drive the driven shaft 21 in a counter-clockwise direction this can be accomplished by removing the end plate 15 and turning the individual clutches 23 and drive rings 33 over on the sleeve 22 so that the bores 29 face in the opposite direction and the springs 30 urge the rollers 31 in a counter-clockwise direction. The rocker arms are also turned over and hence are connected to the drive rings at a point below the driven shaft with the surfaces 40 engaging the underside of the camshaft rather than the upper side as viewed in FIG. 1. To accomplish this, the pivot rod 43 is turned end for end and positioned above the cam 19 and the carrier 44 and fulcrum blocks 46 are disposed below the rocker arms 38. It will be readily appreciated that this will cause the driven shaft 21 to be driven in a counter-clockwise direction. This arrangement is illustrated schematically in FIG. 11.

We have found that our variable speed power transmission can be manufactured for only approximately one-half the cost of most variable speed transmissions heretofore known. In addition, our new transmission is considerably simpler and much more compact for any transmission designed for a given work load. Moreover, our transmission has a longer useful life, partly because of the clutch construction wherein the rollers 31 are disposed a lesser distance from the center of the driven shaft and consequently wear less. Also, upon wear of the rollers and the hexagonal outer surface of the sleeve 22, a new transmission can in effect be obtained by merely rotating the sleeve 22 sixty degrees so that previously unused surfaces will bear against the rollers or by replacing the rollers and rotating the clutch disc 25 sixty degrees.

We have also found that our new transmission has a better range of control than variable speed power transmissions heretofore known in that it can be moved from maximum drive speed to a zero speed whereas other transmissions are capable of variation from maximum speed to a minimum speed which is above zero. In other words, by shifting the control arm 49 to the far left, as viewed in FIG. 1, the fulcrum blocks 45 will be moved to a position over the axis of pivot of the pin 37 and hence the clutches 23 will not be moved or driven thereby. When in this position, no rotary motion will be imparted to the driven shaft 21 despite continued rotation of the crank shaft 17. Thus, our transmission is capable of infinite variations in speed from zero speed to maximum speed, inclusive. Also, we have found that we have better performance in our control mechanism in that we have completely eliminated the tendency of the control which includes the fulcrum blocks from "creeping" during operation of the transmission.

It will be noted that our variable speed transmission is capable of having its speed varied regardless of whether it is running or stationary and that the speed thereof may be changed as frequently as desired. In addition, since its speed may be varied between zero and maximum speed, our variable speed transmission may be utilized as a clutch having instant and positive engagement away from zero position. Moreover, our transmission is capable of running indefinitely at zero position without any build-up of heat.

Wherever herein the term clutch is used, it is intended to include over-running or over-riding clutches, ratchet mechanisms, and all other intermittent drive mechanism for positively rotating a shaft.

It will, of course, be understood that various changes may be made in the form, details, arrangement and proportions of the parts without departing from the scope of this invention which consists of the matter shown and described herein and set forth in the appended claims.

What is claimed is:

1. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
   (a) a corresponding number of rocker arms each pivoted at one end to one of said oscillating levers,
   (b) said rocker arms each having at their other ends cam followers each engageable with one of said cams,
   (c) a fulcrum support,
   (d) rotatable means for supporting said fulcrum support for swinging movement,
   (e) a plurality of fulcrums one for each rocker arm arranged in alignment and carried by said fulcrum support,
   (f) each of said rocker arms having an arcuate way extending throughout a portion of the length thereof,
   (g) means on each of said fulcrums for engagement with the way on the corresponding rocker arm,
   (h) said support upon swinging in either direction simultaneously varying the lever arm of each rocker arm the same amount and
   (i) means for holding said cam followers in engagement with said cams and said fulcrums in engagement with said ways.

2. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
   (a) a corresponding number of rocker arms each pivoted at one end to one of said oscillating levers,
   (b) said rocker arms each having at their other ends cam followers each engageable with one of said cams,
   (c) a fulcrum support,
   (d) rotatable means for supporting said fulcrum support for swinging movement,
   (e) a plurality of fulcrums one for each rocker arm arranged in alignment and carried by said fulcrum support,
   (f) each of said rocker arms having an arcuate way extending throughout a portion of the length thereof,
   (g) means on each of said fulcrums for engagement with the way on the corresponding rocker arm,
   (h) means for pivoting said fulcrums to said fulcrum support,
   (i) said support upon swinging in either direction simultaneously varying the lever arm of each rocker arm the same amount and
   (j) means for holding said cam followers in engagement with said cams and said fulcrums in engagement with said ways.

3. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
   (a) a corresponding number of rocker arms each pivoted at one end to one of said oscillating levers,
   (b) said rocker arms each having at their other ends cam followers each engageable with one of said cams,
   (c) a fulcrum support,
   (d) rotatable means for supporting said fulcrum support for swinging movement,
   (e) a plurality of fulcrums one for each rocker arm arranged in alignment and carried by said fulcrum support,
   (f) each of said rocker arms having an arcuate way extending throughout a portion of the length thereof,
   (g) means on each of said fulcrums for engagement with the way on the corresponding rocker arm,
   (h) means for pivoting said fulcrums to said fulcrum support,
   (i) said fulcrums having arcuate surfaces engaging the arcuate surfaces of said ways and being of substantially the same curvature,
   (j) said support upon swinging in either direction simultaneously varying the lever arm of each rocker arm the same amount and
   (k) means for holding said cam followers in engagement with said cams and said fulcrums in engagement with said ways.

4. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
- (a) a corresponding number of rocker arms each pivoted at one end to one of said oscillating levers,
- (b) said rocker arms each having at their other ends cam followers each engageable with one of said cams,
- (c) a fulcrum support,
- (d) rotatable means for supporting said fulcrum support for swinging movement,
- (e) a pin carried by said fulcrum support and parallel with said driven shaft,
- (f) each of said rocker arms having an arcuate way extending throughout a portion of the length thereof,
- (g) a plurality of fulcrums pivoted on said pin and each having a portion engaging the way of one of said rocker arms,
- (h) said support upon swinging in either direction simultaneously varying the lever arm of each rocker arm the same amount and
- (i) means for holding said cam followers in engagement with said cams and said fulcrums in engagement with said ways.

5. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
- (a) a corresponding number of rocker arms each pivoted at one end to one of said oscillating levers,
- (b) said rocker arms each having at their other ends cam followers each engageable with one of said cams,
- (c) a fulcrum support,
- (d) rotatable means for supporting said fulcrum support for swinging movement,
- (e) a plurality of fulcrums one for each rocket arm arranged in alignment and carried by said fulcrum support,
- (f) each of said rocker arms having an arcuate way extending throughout a portion of the length thereof,
- (g) means on each of said fulcrums for engagement with the way on the corresponding rocker arm,
- (h) said support upon swinging in either direction simultaneously varying the lever arm of each rocker arm the same amount and
- (i) springs acting between each oscillating lever and the cooperating rocker arm for urging the said cam followers against said cams and the way against said fulcrums.

6. In a variable speed power transmission having a driven shaft, a number of one way clutches mounted on said shaft, each including an oscillating lever, a drive shaft spaced from said driven shaft and having a corresponding number of identical cams thereon angularly spaced from one another, the combination of:
- (a) a corresponding number of rocker arms each pivoted at one end to one of said oscillating levers,
- (b) said rocker arms each having at their other ends cam followers each engageable with one of said cams,
- (c) a fulcrum support,
- (d) rotatable means for supporting said fulcrum support for swinging movement,
- (e) a plurality of fulcrums one for each rocker arm arranged in alignment and carried by said fulcrum support,
- (f) each of said rocker arms having an arcuate way extending throughout a portion of the length thereof,
- (g) the center of curvature of said ways being substantially at the axis of the rotatable means of said fulcrum support,
- (h) means on each of said fulcrums for engagement with the way on the corresponding rocker arm,
- (i) said support upon swinging in either direction simultaneously varying the lever arm of each rocker arm the same amount and
- (j) means for holding said cam followers in engagement with said cams and said fulcrums in engagement with said ways.

References Cited by the Examiner

UNITED STATES PATENTS

| | | | |
|---|---|---|---|
| 954,987 | 4/10 | Morgan | 74—124 |
| 1,136,891 | 4/15 | Condee | 74—124 |
| 1,141,682 | 6/15 | Bass | 74—124 |
| 1,471,087 | 10/23 | Zint | 74—124 |
| 1,912,917 | 6/33 | Prout | 74—124 |
| 1,968,030 | 7/34 | De Filippis | 74—119 |
| 2,080,665 | 5/37 | Larsen | 74—124 |
| 2,691,896 | 10/54 | Stageberg | 74—119 |
| 2,797,799 | 7/57 | Ehlert | 74—53 X |

BROUGHTON G. DURHAM, *Primary Examiner.*

MILTON KAUFMAN, *Examiner.*